US009792092B2

(12) United States Patent
Cheung et al.

(10) Patent No.: US 9,792,092 B2
(45) Date of Patent: *Oct. 17, 2017

(54) METHOD OF UNIFYING INFORMATION AND TOOL FROM A PLURALITY OF INFORMATION SOURCES AND COMPUTER PROGRAM PRODUCT AND MATTERIZER USING THE SAME

(71) Applicant: ABLE WORLD INTERNATIONAL LIMITED, Virgin Islands, British (VG)

(72) Inventors: Wai-Tung Cheung, Hong Kong (HK); Chun-Hsiao Lin, New Taipei (TW); Ho-Cheung Cheung, Hong Kong (HK)

(73) Assignee: ABLE WORLD INTERNATIONAL LIMITED, Tortola (VG)

( * ) Notice: Subject to any disclaimer, the term of this patent is extended or adjusted under 35 U.S.C. 154(b) by 264 days.

This patent is subject to a terminal disclaimer.

(21) Appl. No.: 14/821,126

(22) Filed: Aug. 7, 2015

(65) Prior Publication Data
US 2016/0004514 A1 Jan. 7, 2016

Related U.S. Application Data

(63) Continuation-in-part of application No. 14/324,069, filed on Jul. 3, 2014, now Pat. No. 9,134,963.

(51) Int. Cl.
*G06F 9/44* (2006.01)
*G06F 17/30* (2006.01)

(52) U.S. Cl.
CPC .................. *G06F 8/20* (2013.01); *G06F 8/35* (2013.01); *G06F 17/30557* (2013.01)

(58) Field of Classification Search
CPC ......... G06F 8/20; G06F 8/35; G06F 17/30557
USPC .................................................. 717/104, 105
See application file for complete search history.

(56) References Cited

U.S. PATENT DOCUMENTS

| 6,199,195 | B1 |  | 3/2001 | Goodwin et al. |  |
|---|---|---|---|---|---|
| 7,152,228 | B2 | * | 12/2006 | Goodwin | G06F 8/10 |
|  |  |  |  |  | 717/137 |
| 7,895,568 | B1 | * | 2/2011 | Goodwin | G06F 8/35 |
|  |  |  |  |  | 717/107 |

(Continued)

FOREIGN PATENT DOCUMENTS

| CN | 1525312 A | 9/2004 |
|---|---|---|
| CN | 101814028 A | 8/2010 |

(Continued)

*Primary Examiner* — Qing Chen
(74) *Attorney, Agent, or Firm* — WPAT, PC

(57) ABSTRACT

A method of unifying information and tool from a plurality of information sources includes the following steps. Firstly, an access scheme is provided to retrieve attributes and an associated link from an original information and/or attributes and an associated link from an original tool. Then, the original information is modeled into a unified information unit with a first unified data model by re-organizing the attributes and the associated link of the original information, and/or the original tool is modeled into a unified tool with a second unified data model by re-organizing the attributes and the associated link of the original tool. A format of the original information is modeled by the first unified data model and/or a format of the original tool is modeled by the second unified data model.

17 Claims, 7 Drawing Sheets

(56) References Cited

U.S. PATENT DOCUMENTS

| | | | | |
|---|---|---|---|---|
| 2002/0023261 | A1* | 2/2002 | Goodwin | G06F 8/10 717/146 |
| 2004/0015819 | A1* | 1/2004 | Romano-Critchley | G06F 8/20 717/102 |
| 2006/0236302 | A1* | 10/2006 | Bateman | G06F 8/34 717/104 |
| 2009/0235230 | A1* | 9/2009 | Lucas | G06F 8/20 717/108 |
| 2011/0246530 | A1* | 10/2011 | Malafsky | G06N 5/022 707/794 |
| 2011/0282949 | A1* | 11/2011 | Rivkin | G06F 9/541 709/206 |
| 2013/0151705 | A1* | 6/2013 | Menon | G06Q 10/1053 709/226 |
| 2014/0040178 | A1 | 2/2014 | Sherman et al. | |
| 2014/0297713 | A1* | 10/2014 | Meigen | G06F 8/20 709/203 |
| 2014/0324393 | A1* | 10/2014 | Alfassi | G06F 17/5009 703/1 |

FOREIGN PATENT DOCUMENTS

| | | |
|---|---|---|
| CN | 103092980 A | 5/2013 |
| CN | 10348525 A | 12/2013 |
| WO | WO2005053335 A1 | 6/2005 |

\* cited by examiner

METHOD OF UNIFYING INFORMATION AND TOOL FROM A PLURALITY OF INFORMATION SOURCES AND COMPUTER PROGRAM PRODUCT AND MATTERIZER USING THE SAME

CROSS-REFERENCE TO RELATED APPLICATION

This application is continuation-in-part application of U.S. patent application Ser. No. 14/324,069, field Jul. 3, 2014 and hereby incorporates the content of this application by reference.

FIELD OF THE INVENTION

The present invention relates to a method of unifying information and tool from a plurality of information sources and a computer program product and a matterizer using the method.

BACKGROUND OF THE INVENTION

In the real world, information is defined as a sequence of symbols that can be interpreted as a message. Information is any kind of event that affects the state of a dynamic system that can interpret the information. Information can also be categorized according to its attribute or form, such as text, film, photo, or anything meaningful for user to access the computer.

A tool in the real world is defined as a mechanism which is used to perform or facilitate manual or mechanical work. In computer sciences the tool is often defined as an application program that creates or manipulates, modifies or analyzes information.

In today's science and technology, information and tools are scattered in different information sources in different formats. Some of them are hosted for the same purpose and some of them are not. For those being hosted for different purposes, some of them still have essentially similar attributes and can be indirectly re-defined or re-purposed.

The existing art will be described as below. Firstly, some internet service providers provide photo sharing services, allowing a user to store photos in his/her online storage in a specific format. Under some conditions, the user, limited by his or her working environment, is not capable of downloading the photos and processing the photos in that specific format. Therefore, it is desirable to provide a scheme to unify the photos from that specific format into one that the working environment will allow it to work with.

Secondly, some service providers provide on-line music services that are in support of reading specified access structures. Generally, users can store their MP3 files on the Dropbox and categorize the stored MP3 files in different folders which correspond to different albums. Although the MP3 files placed on the Dropbox are intentionally for the back-up use rather than being utilized for the content of the music service, the MP3 files placed in the same folder may be deemed as the same album after being classified. That is, it is doable to provide a scheme to enable the user to convert the above mentioned file structure on the Dropbox into a readable format of the on-line music service providers in a convenient way. Consequently, the users can obtain and manage their own music resources in a more convenient manner.

Further, since there are plenty of information sources, a lot of tools have been provided. As for the music service, different tools (e.g., EQ Adjustment tools and Notch filters, etc.) have been provided. It is highly desirable to provide a scheme to model the format of the tools from different sources into a unified one and make them accessible/manageable in one working environment, thereby facilitating the user to manage his/her own resources conveniently.

SUMMARY OF THE INVENTION

The purpose of the present invention is to develop the scheme as mentioned above to model and optionally redefine the scattered information and/or tool(s) from different information sources into one unified information unit(s) and/or unified tool(s) for the user to manage the scattered information and/or tool(s) conveniently.

In accordance with an aspect of the present invention, there is provided a method of unifying information and tool from a plurality of information sources. The method includes the following steps. In a step (i), a matterizer retrieves attributes and an associated link from an original information and/or attributes and an associated link from an original tool, wherein the original information and the original tool are requested from at least one information source of the plurality of information sources. In a step (ii), the matterizer models the original information into a unified information unit with a first unified data model by re-organizing the attributes and the associated link of the original information, and/or the matterizer models the original tool into a unified tool with a second unified data model by re-organizing the attributes and the associated link of the original tool, wherein a format of the original information is modeled by the first unified data model and/or a format of the original tool is modeled by the second unified data model.

In an embodiment, if the attributes accessible from the original information correspond to the attributes to be unified in the unified information unit, the unified information unit is directly produced.

In an embodiment, if the attributes accessible from the original information do not correspond to the attributes to be unified in the unified information unit, before the step (ii), the method further comprises a step (i') of allowing the matterizer to firstly re-define the original information by logically re-organizing the attributes and the associated link of the original information and then convert the original information into a new original information with attributes corresponding to the attributes to be unified in the unified information unit, so that the unified information unit is indirectly produced in the step (ii).

In an embodiment, basic attributes of the unified information unit include a first type and a first link indicating where the original information is located.

In an embodiment, a data type is defined by the first type, wherein the data type is defined by the first type according to a data content of the original information obtained through the first link.

In an embodiment, the first link refers to a uniform resource identifier (URI) in a remote end or a local end, or refers to a block address in a memory while executing a program.

In an embodiment, basic attributes of the unified tool include a second type and a second link indicating where the original tool is located.

In an embodiment, a component type of the original tool is defined by the second type, wherein a physical component essential to the unified tool for proceeding with, plugging in, managing or executing is obtained through the component type and the second link.

In an embodiment, the second link refers to a uniform resource identifier (URI) in a remote end or a local end, or refers to a block address in a memory while executing a program.

In an embodiment, the basic attributes of the unified tool further include a processible information type for indicating a type of the unified information unit that is processible by the unified tool, wherein the processible information type is in a number from zero to a multiple number.

In an embodiment, if the original tool from the plurality of information sources is compatible with a working environment of a workspace, the unified tool is directly produced according to the attributes and the associated link of the original tool. Whereas, if the original tool from the plurality of information sources is incompatible with the working environment of the workspace, the unified tool is indirectly produced via an adapter and/or a software development kit (SDK) of the original tool to drive the original tool, wherein the adapter provides an interface implementation compatible with the workspace.

In an embodiment, the matterizer re-organizes the desired attributes and the associated link to produce a new unified information unit and/or a new unified tool without downloading the original information and/or the original tool.

In an embodiment, the original information includes a file, a web page, a database row, a policy, a rule or any information accessible from a corresponding machine or a server.

In an embodiment, the original tool includes a utility, a widget, an agent, an application, a service or any executable element accessible from a corresponding machine or a server.

In an embodiment, the matterizer is a means, a device or a program code.

In accordance with another aspect of the present invention, there is provided a matterizer for unifying information and tool from a plurality of information sources. The matterizer includes a first means and a second means. The first means is used for retrieving attributes and an associated link from an original information and/or attributes and an associated link from an original tool, wherein the original information and the original tool are requested from the plurality of information sources. The second means is used for modeling the original information into a unified information unit with a first unified data model by re-organizing the attributes and the associated link of the original information, and/or modeling the original tool into a unified tool with a second unified data model by re-organizing the attributes and the associated link of the original tool, wherein a format of the original information is modeled by the first unified data model and/or a format of the original tool is modeled by the second unified data model.

In accordance with a further aspect of the present invention, there is provided a computer program product for unifying information and tool from a plurality of information sources. The computer program product includes a program code. While the computer program product is executed in a computer, the program code performs the following steps. A step (i) retrieves attributes and an associated link from an original information and/or attributes and an associated link from an original tool, wherein the original information and the original tool are requested from at least one information source of the plurality of information sources. A step (ii) models the original information into a unified information unit with a first unified data model by re-organizing the attributes and the associated link of the original information, and/or models the original tool into a unified tool with a second unified data model by re-organizing the attributes and the associated link of the original tool, wherein a format of the original information is modeled by the first unified data model and/or a format of the original tool is modeled by the second unified data model.

In an embodiment, if the attributes accessible from the original information correspond to the attributes to be unified in the unified information unit, the unified information unit is directly produced. Whereas, if the attributes accessible from the original information do not correspond to the attributes to be unified in the unified information unit, before the step (ii), the program code further performs a step (i') of firstly re-defining the original information by logically re-organizing the attributes and the associated link of the original information and then converting the original information into a new original information with attributes corresponding to the attributes to be unified in the unified information unit, so that the unified information unit is indirectly produced in the step (ii).

In an embodiment, if the original tool from the plurality of information sources is compatible with a working environment of a workspace, the unified tool is directly produced according to the attributes and the associated link of the original tool. Whereas, if the original tool from the plurality of information sources is incompatible with the working environment of the workspace, the unified tool is indirectly produced via an adapter and/or a software development kit (SDK) of the original tool to drive the original tool, wherein the adapter provides an interface implementation compatible with the workspace.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention is more fully appreciated by reference to the following description, including the following glossary of terms and the concluding examples. For the sake of brevity, the disclosures of the publications, including patents, cited in this specification are herein incorporated by reference.

The term "matterizer" used herein is a means, device or program code to perform procedures of unifying information and tool which are explored by the present invention. The term "information source" used herein is defined as a sequence of symbols that can be interpreted as a useful message in the most limited technical meaning. And the useful message is used for organizing and labeling information. For example, the information sources include website, intranet, social network, software, electronic book, database and other media of information. The term "original information" used herein is a file, a webpage, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto.

Having a service platform which is able to manage, process or access scattered information and/or tool from a plurality of different information sources is being a stronger and stronger demand from users. To achieve the goal, a unified modeling scheme is provided to facilitate the development.

Figure 1A:
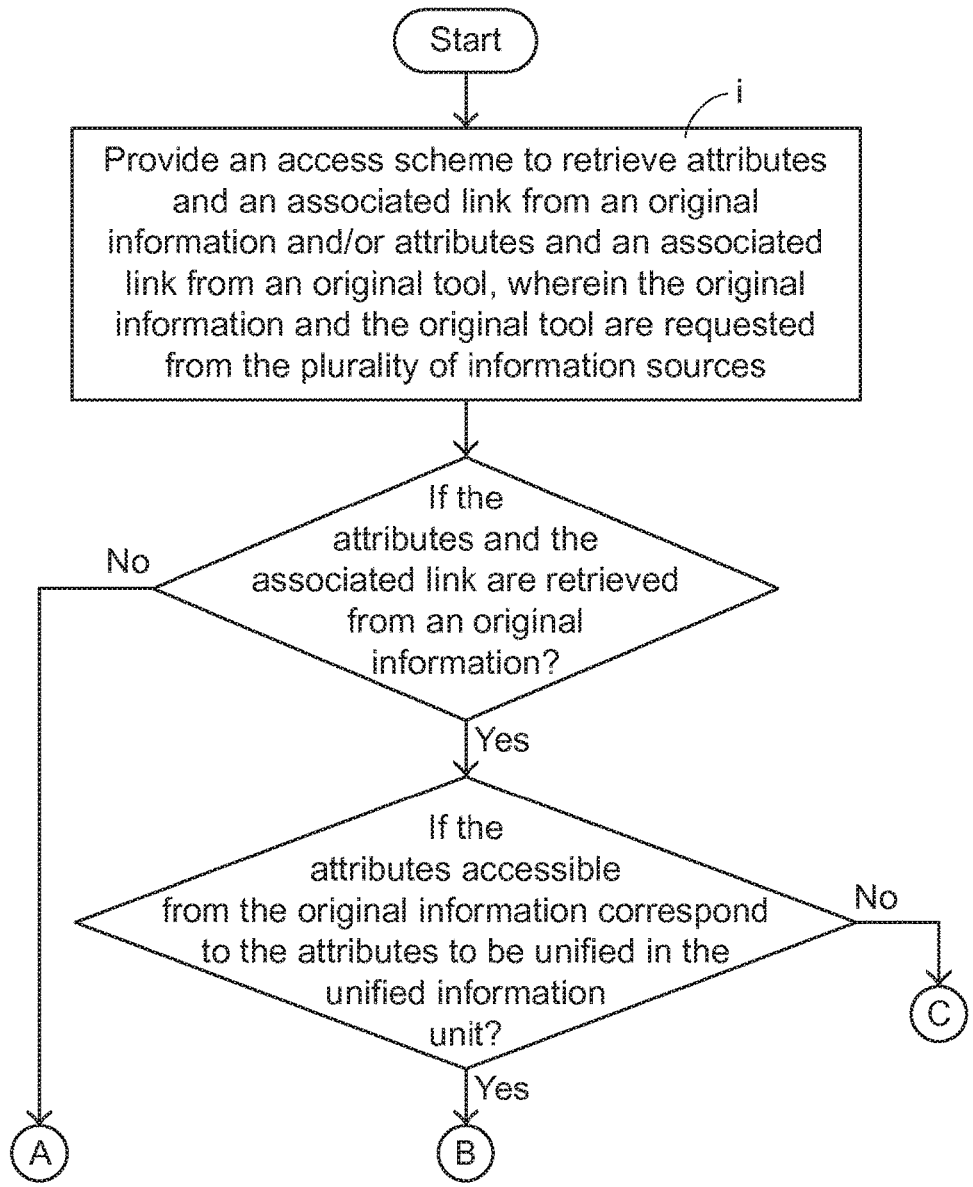
FIG. 1A and FIG. 1B is a flowchart illustrating a method of unifying information and tool from a plurality of information sources according to an embodiment of the present invention.
Figure 1B:
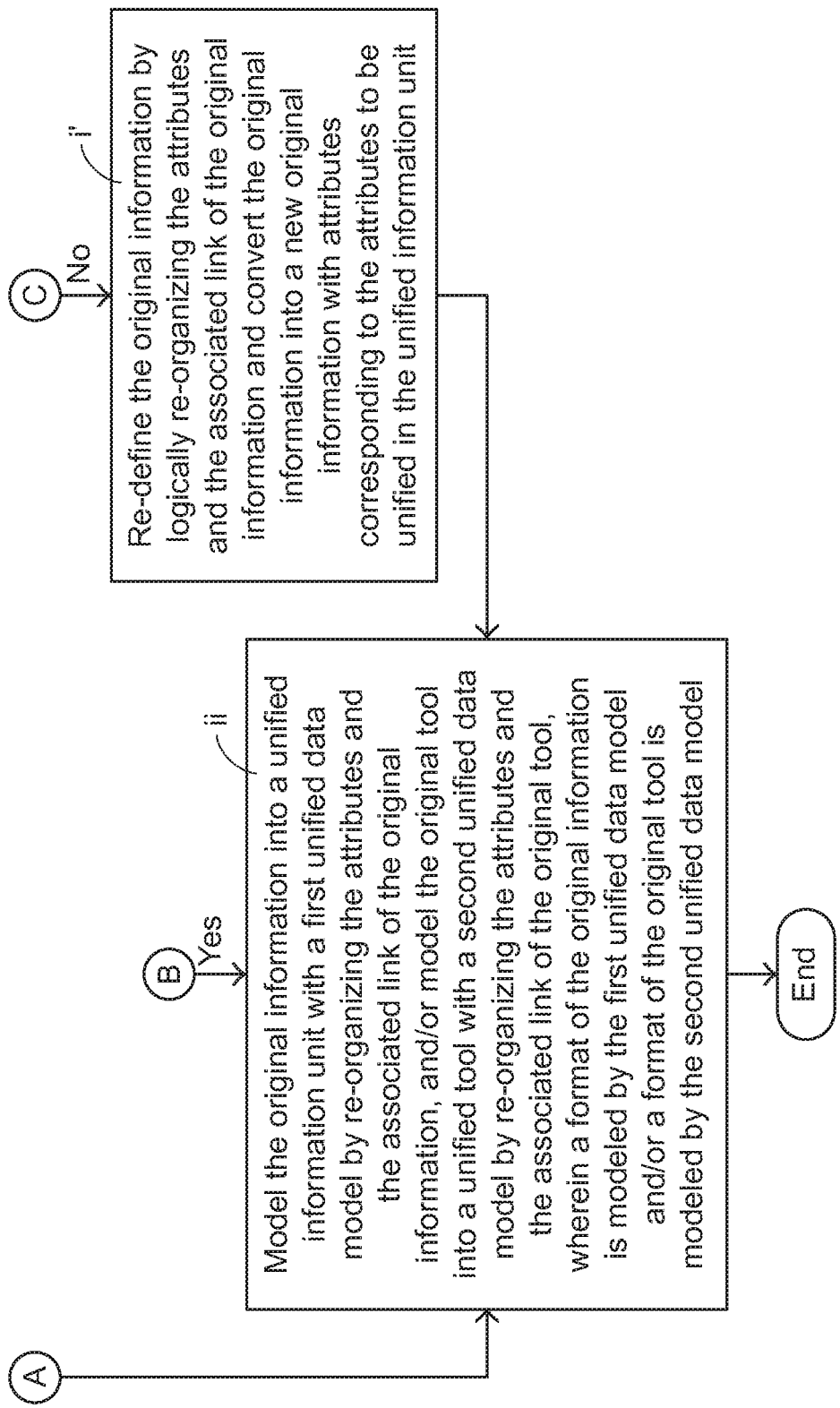

FIG. 1A and FIG. 1B is a flowchart illustrating a method of unifying information and tool from a plurality of information sources according to an embodiment of the present invention. The method comprises the following steps:

(i): providing an access scheme to retrieve attributes and an associated link from an original information and/or attributes and an associated link from an original tool, wherein the original information and the original tool are requested from the plurality of information sources; and (ii) modeling the original information into a unified information unit with a first unified data model by re-organizing the attributes and the associated link of the original information, and/or modeling the original tool into a unified tool with a second unified data model by re-organizing the attributes and the associated link of the original tool, wherein a format of the original information is modeled by the first unified data model and/or a format of the original tool is modeled by the second unified data model.

In this embodiment, the basic attributes of the unified information unit include a first "type" and a first "link". The first link indicates where the original information is located. Preferably but not exclusively, the first link refers to a uniform resource identifier (URI) in a remote end or a local end, or refers to a block address in a memory while executing a program. A data type is defined by the first type. Moreover, the data type is defined by the first type according to the data content of the original information obtained through the first link.

During the process of modeling the format of the original information, if the original information corresponds to the first unified data model, the unified information unit is directly produced according to the attributes and the associated link. Whereas, if the original information does not correspond to the first unified data model, the unified information unit is indirectly produced by logically recombining the attributes and the associated link of the original information into a new original information corresponding to the first unified data model.

In particular, if the attributes accessible from the original information correspond to the attributes to be unified in the unified information unit, the unified information unit is directly produced. If the attributes accessible from the original information do not correspond to the attributes to be unified in the unified information unit, the method of the present invention further comprises a step (i') before the step (ii). In the step (i'), the original information is firstly re-defined by logically re-organizing the attributes and the associated link of the original information, and then the original information is converted into a new original information with the attributes corresponding to the attributes to be unified in the unified information unit. Consequently, the unified information unit is indirectly produced in the step (ii).

In this embodiment, the basic attributes of the unified tool include a second "type" and a second "link". The second link indicates where the original tool is located. Preferably but not exclusively, the second link refers to a uniform resource identifier (URI) in a remote end or a local end, or refers to a block address in a memory while executing a program. A component type of the original tool is defined by the second type. Moreover, a physical component essential to the unified tool for proceeding with, plugging in, managing or executing is obtained through the component type and the second link. In addition, the basic attributes of the unified tool further include a processible information type for indicating the information type of the unified information unit that is processible by the unified tool. The processible information type is in a number from zero to a multiple number.

During the process of modeling the format of the original tool, if the original tool from the information source is compatible with a working environment of a workspace (e.g., a website platform), i.e., corresponds to the second unified data model, the unified tool is directly produced according to the attributes and the associated link of the original tool. Whereas, if the original tool from the information source is incompatible with the working environment of the workspace (e.g., the website platform), the unified tool is indirectly produced via an adapter and/or a software development kit (SDK) of the original tool to drive the original tool. The adapter provides an interface implementation compatible with the workspace.

Consequently, by re-organizing the desired attributes and the associated link, the method of the present invention can allow the users to produce the unified information unit and/or the unified tool without downloading the original information and/or the original tool.

Hereinafter, the present invention will be illustrated with reference to the following four examples.

Figure 2:
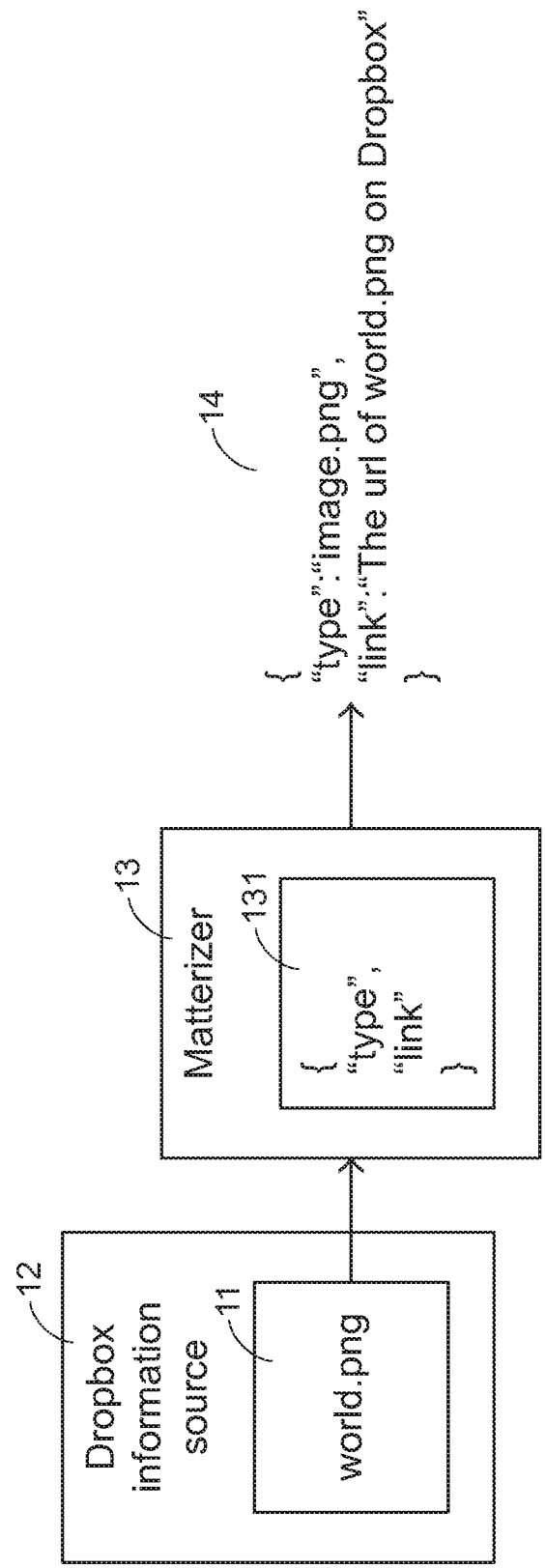
FIG. 2 is a schematic diagram illustrating an exemplary concept of modeling an original information into a unified information unit by the method of FIG. 1A and FIG. 1B.

FIG. 2 is a schematic diagram illustrating an exemplary concept of modeling an original information into a unified information unit by the method of FIG. 1A and FIG. 1B. The process of directly producing the unified information unit by a matterizer 13 according to the attributes and the associated link of the original information is also shown. As shown in FIG. 2, the original information is an image file 11 from a Dropbox information source 12. The image file 11 is in a format of portable network graphics (png) such as world.png. The matterizer 13 is a means, a device or a program code to perform the process of unifying the original information and the original tool according to the steps of FIG. 1A and FIG. 1B. The unified data model 131 of the matterizer 13 is to model the format (i.e., portable network graphics) of the image file 11 (world.png). Moreover, the matterizer 13 models the image file 11 (world.png) with the unified data model 131. Consequently, the following unified information unit 14 is produced according to the attributes and the associated link of the image file 11 (world.png).

```
{
    "type": "image.png",
    "link": "The url of world.png on Dropbox"
}
```

As shown in FIG. 2, the format (i.e., portable network graphics) of the image file 11 corresponds to the unified data model 131. That is, the attributes accessible from the original information (i.e., the image file 11) correspond to the attributes to be unified in the unified information unit 14. Consequently, any photo management app that can recognize the above unified data model can access the image file 11 in the format of portable network graphics (png) through the produced unified information unit 14.

Figure 3:
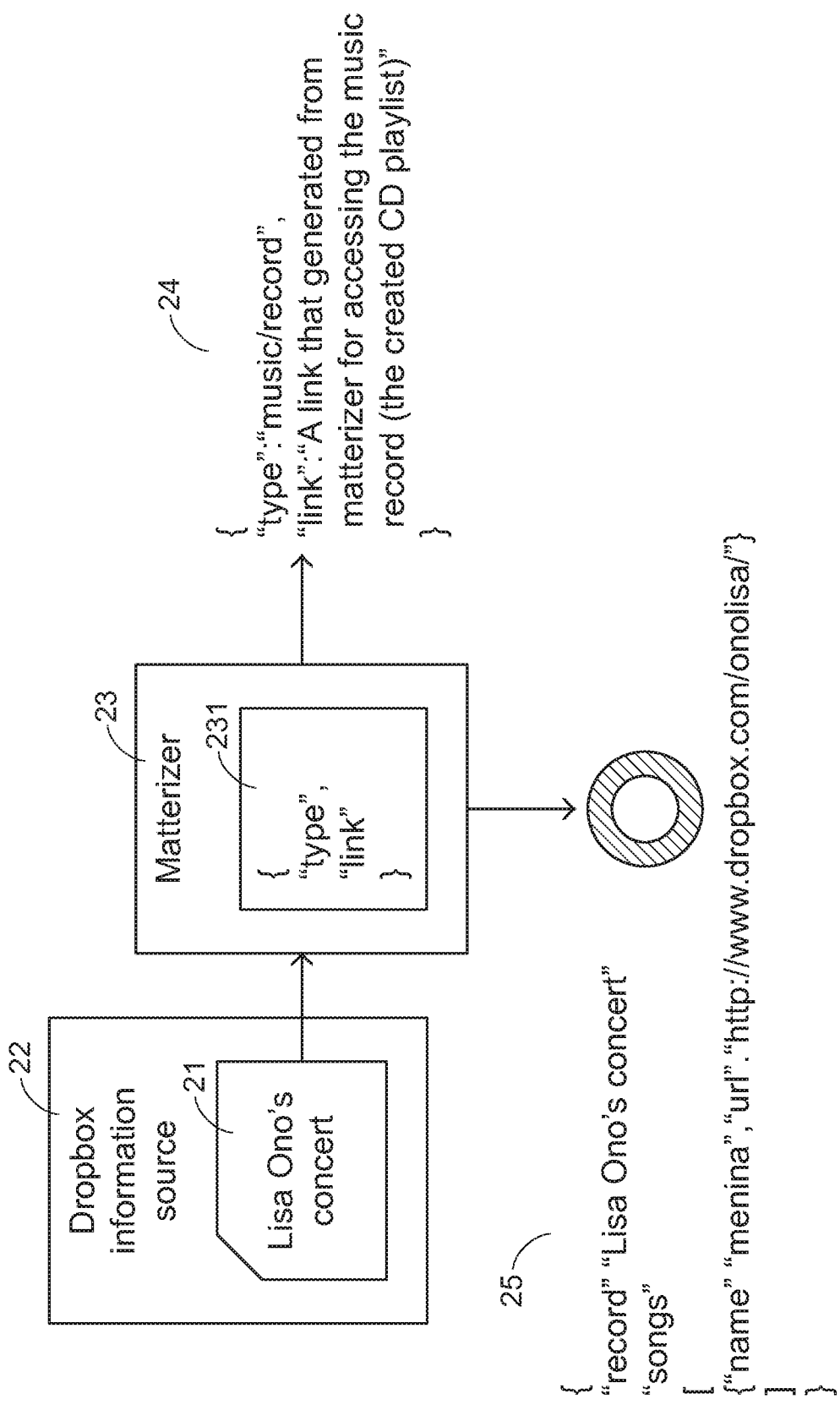
FIG. 3 is a schematic diagram illustrating another exemplary concept of modeling an original information into a unified information unit by the method of FIG. 1A and FIG. 1B.

FIG. 3 is a schematic diagram illustrating another exemplary concept of modeling an original information into a unified information unit by the method of FIG. 1A and FIG. 1B. The process of re-defining and modeling the original information into the unified information unit by a matterizer 23 is also shown. As shown in FIG. 3, the original information includes a folder 21 and a file "Lisa Ono's concert" in the folder 21. The unified data model 231 of the matterizer 23 is to model a CD playlist which is formatted in a JSON structure.

The structure of the folder 21 of Lisa Ono's concert in the Dropbox information source 22 does not directly correspond to the formatted CD playlist structure (i.e., the JSON structure). However, the attributes of these two structures are essentially similar. For example, the folder 21 can be mapped to a music record, and the files in the folder 21 can be mapped to songs in the music record. Consequently, the matterizer 23 can firstly re-define the structure of the folder 21 into the formatted CD playlist structure by re-organizing the attributes and the associated link of the folder 21 and then produce a new CD playlist 25 as follows.

```
{
    "record" "Lisa Ono's concert"
    "songs"
    [
        {"name" "menina", "url". "http://www.dropbox.com/onolisa/"}
    ]
}
```

After the new CD playlist 25 is produced, the matterizer 23 separates the attributes from the description and the associated link of the new CD playlist 25, and re-organizes the new attributes (e.g., the music/record) and the associated link of the new CD playlist 25 into a unified information unit 24 as follows.

```
{
    "type": "music/record",
    "link": "A link that generated from matterizer for accessing the music record (the created CD playlist)"
}
```

The above description of FIG. 3 also embodies the step (i') of FIG. 1A and FIG. 1B. That is, if the attributes accessible from original information do not correspond to the attributes to be unified in the unified information unit, the original information is firstly re-defined by logically re-organizing the attributes and the associated link of the original information, and then the original information is converted into a new original information with the attributes corresponding to the attributes to be unified in the unified information unit. Consequently, the unified information unit is indirectly produced in the step (ii).

Consequently, any media player that can recognize the aforementioned unified data model 231 can access the "Lisa Ono's concert" from the folder 21 of the Dropbox information source 22 and new CD playlist 25 through the produced unified information unit 24. In other words, by separating the data management app (Dropbox, Evernote, etc.) and the contents of the data management app, the matterizer can re-define the original information and re-organize the associated link and the attributes to a new unified information unit.

Figure 4:
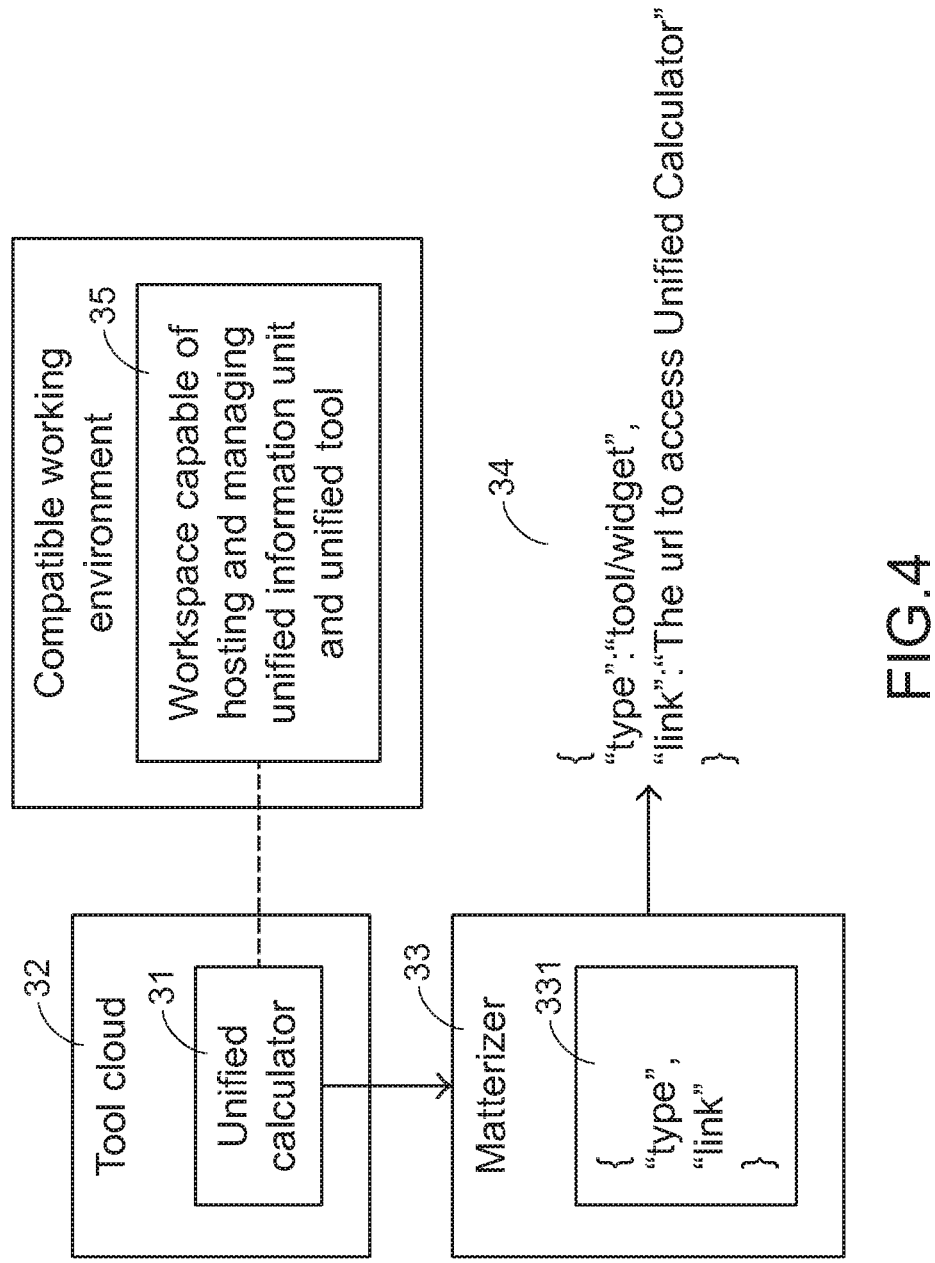
FIG. 4 is a schematic diagram illustrating an exemplary concept of modeling an original tool into a unified tool by the method of FIG. 1A and FIG. 1B.

FIG. 4 is a schematic diagram illustrating an exemplary concept of modeling an original tool into a unified tool by the method of FIG. 1A and FIG. 1B. The process of directly producing the unified tool by a matterizer 33 according to the attributes and the associated link of the original tool is also shown. As shown in FIG. 4, the original tool is a tool (widget) of a unified calculator 31 obtained from a tool cloud 32. The original tool is compatible with the working environment of the workspace 35. The unified data model 331 of the matterizer 33 is to model the tool (widget) which is compatible with the working environment of the workspace 35. Moreover, the matterizer 33 models the unified calculator 31 with the unified data model 331. Consequently, the following unified tool 34 is produced according to the attributes and the associated link of the unified calculator 31.

```
{
    "type":"tool/widget",
    "link":"The url to access Unified Calculator"
}
```

That is, if the attributes accessible from the unified calculator 31 (i.e., the original tool) are compatible with the working environment of the workspace 35, the unified tool 34 is directly produced. Consequently, any other workspace that can recognize the aforementioned unified data model 331 and provide the compatible working environment can access the unified calculator 31 through the through the produced unified tool 34.

Figure 5:
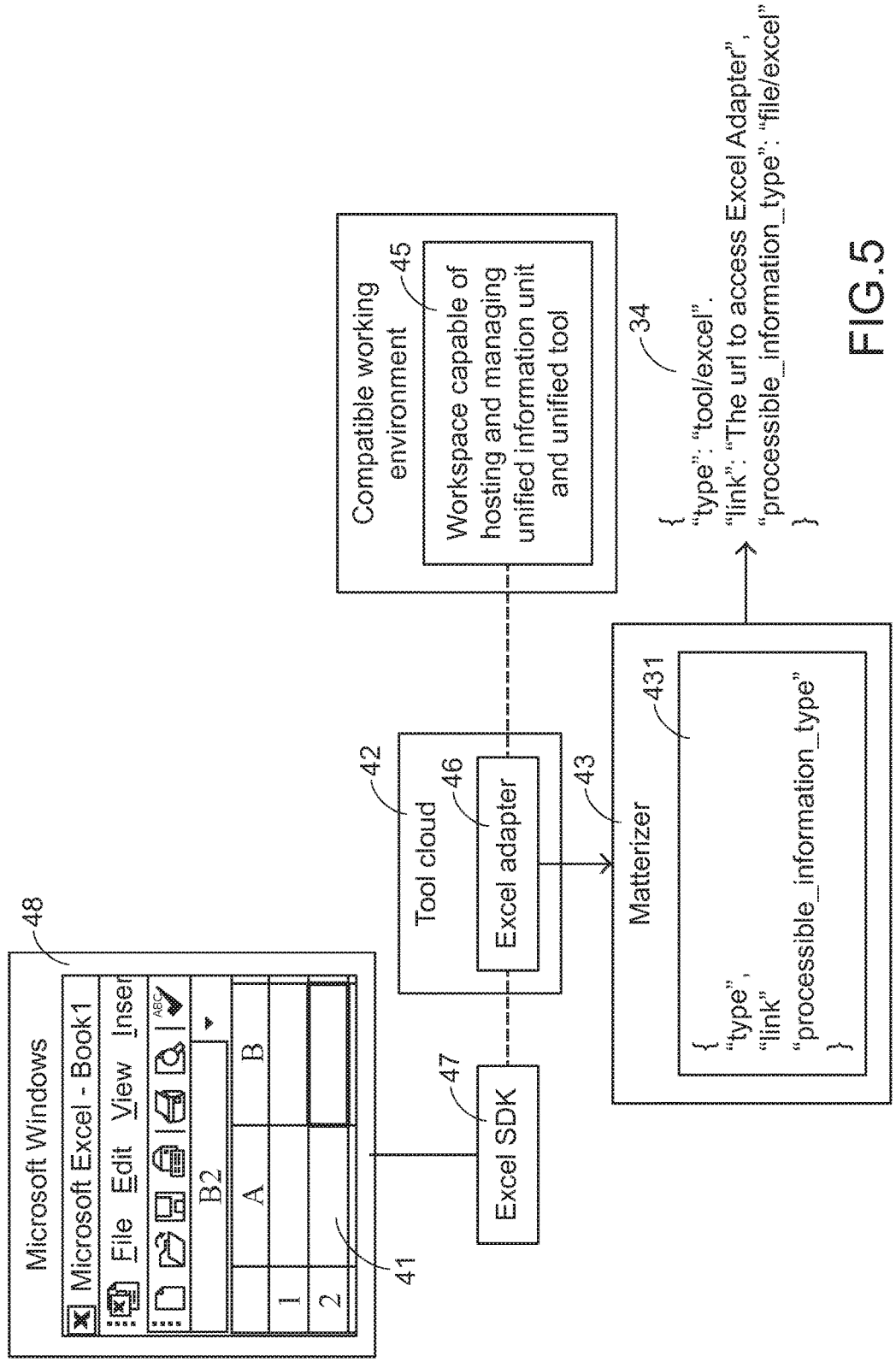
FIG. 5 is a schematic diagram illustrating another exemplary concept of modeling an original tool into a unified tool by the method of FIG. 1A and FIG. 1B.

FIG. 5 is a schematic diagram illustrating another exemplary concept of modeling an original tool into a unified tool by the method of FIG. 1A and FIG. 1B. The process of re-defining and modeling the original tool into the unified tool by a matterizer 43 is also shown. In some situations, the software or tools can only run on a particular operating system. For example, as shown in FIG. 5, the original tool is an Excel tool 41 that can only run on a Microsoft Window operating system 48. However, the original tool is incompatible with the working environment of a workspace 45. For solving this problem and enabling the Excel tool 41 to run in the workspace 45, an Excel adapter 46 in the tool cloud 42 is used to execute interface implementation compatible with the workspace 45 and drive an Excel program 41 to complete a task via an Excel software development kit (SDK) 47.

In particular, the unified data model 431 of the matterizer 43 is to model the Excel tool 41 which is compatible with the working environment of the workspace 45. Moreover, the matterizer 43 separates the attributes from the description and the associated link of the Excel adapter 46 and re-organizes the attributes and associated link of the Excel adapter 46 into a complex unified tool 44 as follows.

```
{
"type": "tool/excel",
"link": "The url to access Excel Adapter",
"processible_information_type": "file/excel"
}
```

Consequently, any workspace that can provide the compatible working environment can indirectly access the Excel tool 41 in the Microsoft Window operating system 48 by accessing the Excel adapter 46 based on the unified tool 44.

As shown in FIG. 5, the basic attributes of the unified tool 44 further include a processible information type for indicating the information type of the unified information unit that is processible by the unified tool. The processible information type is "file/excel". The number of the processible information type as shown in FIG. 5 is 1. It is noted that the number of the processible information type is not restricted. For example, the processible information type is in a number from zero to a multiple number.

As mentioned in FIGS. 4 and 5, if the original tool from the information source is compatible with a working environment of a workspace (e.g., a website platform), i.e., corresponds to the unified data model, the unified tool is directly produced according to the attributes and the associated link of the original tool. Whereas, if the original tool from the information source is incompatible with the working environment of the workspace (e.g., the website platform), the unified tool is indirectly produced via an adapter and/or a software development kit (SDK) of the original tool to drive the original tool. The adapter provides an interface implementation compatible with the workspace.

Figure 6:
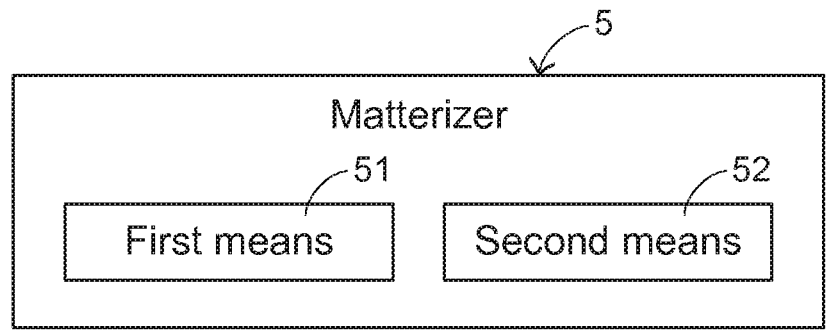
FIG. 6 is a schematic block diagram illustrating a matterizer for performing the method of FIG. 1A and FIG. 1B.

FIG. 6 is a schematic block diagram illustrating a matterizer for performing the method of FIG. 1A and FIG. 1B. As shown in FIG. 6, the matterizer 5 comprises a first means 51 and a second means 52. The first means 51 is used for retrieving attributes and an associated link from an original information and/or attributes and an associated link from an original tool. The original information and the original tool are requested from a plurality of information sources. The approach of retrieving the attributes and the associated link from the original information and/or the approach of retrieving the attributes and the associated link from the original tool are similar to those mentioned above, and the detailed descriptions thereof are omitted.

The second means 52 is used for modeling the original information into a unified information unit with a first unified data model by re-organizing the attributes and the associated link of the original information, and/or modeling the original tool into a unified tool with a second unified data model by re-organizing the attributes and the associated link of the original tool, wherein a format of the original information is modeled by the first unified data model and/or a format of the original tool is modeled by the second unified data model. The approach of modeling the original information into the unified information unit with the first unified data model and the approach of modeling the original tool into the unified tool with the second unified data model are similar to those mentioned above, and the detailed descriptions thereof are omitted.

In an embodiment, each of the first means 51 and the second means 52 is hardware, software or firmware in the matterizer, but is not limited thereto.

Figure 7:
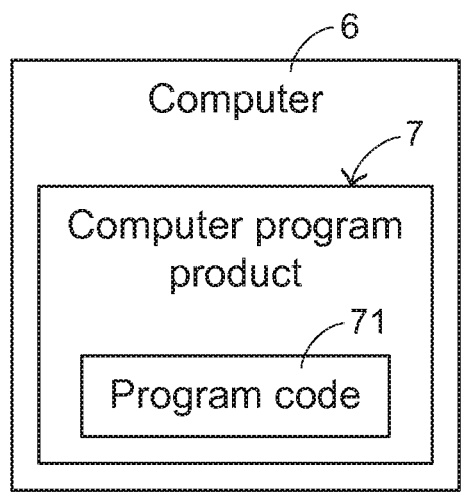
FIG. 7 is a schematic block diagram illustrating a computer program product using the method of FIG. 1A and FIG. 1B.

FIG. 7 is a schematic block diagram illustrating a computer program product using the method of FIG. 1A and FIG. 1B. For example, the computer program product 7 is software package. The computer program product 7 is used for unifying the information and the tools from a plurality of information sources. Moreover, the computer program product 7 contains a program code 71. The program code 71 can perform the steps of the method of FIG. 1A and FIG. 1B. While the computer program product 7 is executed in a computer 6, the implementations of these steps are similar to those mentioned above, and the detailed descriptions thereof are omitted.

From the above descriptions, the present invention provides a method of unifying the original information (e.g., data, file, policy, rule, etc.) and the original tool (e.g., utility, application, service, etc.) from a plurality of information sources, a computer program product and a matterizer. The method, the computer program product and the matterizer of the present invention have the following advantages.

Firstly, when compared with the prior art technologies, a user can conveniently adopt a unified information unit and a unified tool by unifying the original information and the original tool from different information sources.

Secondly, the unified information unit and the unified tool provided by the present invention can be interactive. That is, the unified tool is allowed to process a corresponding unified information unit for accomplishing a task.

Thirdly, a user can access the original information through a unified information unit without downloading the original information, wherein the unified information unit is re-organized from the desired attribute and the associated link of the original information.

Fourthly, even if the original tool is incompatible with the working environment of the workspace (e.g., the website platform), the original tool can be executed in the workspace without the need of installing the operating system for running the original tool after the original tool is unified into the unified tool by the unifying process.

Fifthly, the trouble of the non-compatible information and/or tools can be solved according to the modeling and optional re-defining process.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of unifying information and tool from a plurality of information sources, the method comprising steps of:

(i) retrieving, by a matterizer, attributes and an associated link from an original information and/or attributes and an associated link from an original tool, wherein the original information and the original tool are requested from at least one information source of the plurality of information sources; and (ii) modeling, by the matterizer, the original information into a unified information unit with a first unified data model by re-organizing the attributes and the associated link of the original information and/or modeling, by the matterizer, the original tool into a unified tool with a second unified data model by re-organizing the attributes and the associated link of the original tool, wherein a format of the original information is modeled by the first unified data model and/or a format of the original tool is modeled by the second unified data model, wherein if the attributes accessible from the original information correspond to the attributes to be unified in the unified information unit, the unified information unit is directly produced, and wherein if the attributes accessible from the original information do not correspond to the attributes to be unified in the unified information unit, before the step (ii), the method further comprises a step (i') of firstly re-defining, by the matterizer, the original information by logically re-organizing the attributes and the associated link of the original information and then converting the original information into a new original information with attributes corresponding to the attributes to be unified in the unified information unit, so that the unified information unit is indirectly produced in the step (ii).

2. The method according to claim 1, wherein if the attributes accessible from the original information correspond to the attributes to be unified in the unified information unit, the unified information unit is directly produced.

3. The method according to claim 1, wherein basic attributes of the unified information unit include a first type and a first link indicating where the original information is located.

4. The method according to claim 3, wherein a data type is defined by the first type, and wherein the data type is defined by the first type according to a data content of the original information obtained through the first link.

5. The method according to claim 3, wherein the first link refers to a uniform resource identifier (URI) in a remote end or a local end, or refers to a block address in a memory while executing a program.

6. The method according to claim 3, wherein basic attributes of the unified tool include a second type and a second link indicating where the original tool is located.

7. The method according to claim 6, wherein a component type of the original tool is defined by the second type, and wherein a physical component essential to the unified tool for proceeding with, plugging in, managing, or executing is obtained through the component type of the original tool and the second link.

8. The method according to claim 6, wherein the second link refers to a uniform resource identifier (URI) in a remote end or a local end, or refers to a block address in a memory while executing a program.

9. The method according to claim 6, wherein the basic attributes of the unified tool further include a processible information type for indicating type of the unified information unit that is processible by the unified tool, and wherein the processible information type is in a number from zero to a multiple number.

10. The method according to claim 1, wherein if the original tool from the plurality of information sources is compatible with a working environment of a workspace, the unified tool is directly produced according to the attributes and the associated link of the original tool, wherein if the original tool from the plurality of information sources is incompatible with the working environment of the workspace, the unified tool is indirectly produced via an adapter and/or a software development kit (SDK) of the original tool to drive the original tool, and wherein the adapter provides an interface implementation compatible with the workspace.

11. The method according to claim 1, wherein the matterizer re-organizes the attributes and the associated link to produce a new unified information unit and/or a new unified tool without downloading the original information and/or the original tool.

12. The method according to claim 1, wherein the original information includes a file, a web page, a database row, a policy, a rule, or any information accessible from a corresponding machine or a server.

13. The method according to claim 1, wherein the original tool includes a utility, a widget, an agent, an application, a service, or any executable element accessible from a corresponding machine or a server.

14. The method according to claim 1, wherein the matterizer is a means, a device, or a program code.

15. A matterizer for unifying information and tool from a plurality of information sources, the matterizer comprising:
    a processor;
    a memory;
    a first means for retrieving attributes and an associated link from an original information and/or attributes and an associated link from an original tool, wherein the original information and the original tool are requested from at least one information source of the plurality of information sources; and
    a second means for modeling the original information into a unified information unit with a first unified data model by re-organizing the attributes and the associated link of the original information and/or modeling the original tool into a unified tool with a second unified data model by re-organizing the attributes and the associated link of the original tool, wherein a format of the original information is modeled by the first unified data model and/or a format of the original tool is modeled by the second unified data model, wherein if the attributes accessible from the original information correspond to the attributes to be unified in the unified information unit, the unified information unit is directly produced, and wherein if the attributes accessible from the original information do not correspond to the attributes to be unified in the unified information unit, before the step (ii), the method further comprises a step (i') of firstly re-defining, by the matterizer, the original information by logically re-organizing the attributes and the associated link of the original information and then converting the original information into a new original information with attributes corresponding to the attributes to be unified in the unified information unit, so that the unified information unit is indirectly produced in the step (ii).

16. A computer program product stored in a memory of a computer for unifying information and tool from a plurality of information sources, the computer program product comprising a program code, wherein, while the computer program product is executed by a processor of the computer, the program code performs steps of:
    (i) retrieving, by a matterizer, attributes and an associated link from an original information and/or attributes and an associated link from an original tool, wherein the original information and the original tool are requested from at least one information source of the plurality of information sources; and
    (ii) modeling, by the matterizer, the original information into a unified information unit with a first unified data model by re-organizing the attributes and the associated link of the original information and/or modeling, by the matterizer, the original tool into a unified tool with a second unified data model by re-organizing the attributes and the associated link of the original tool, wherein a format of the original information is modeled by the first unified data model and/or a format of the original tool is modeled by the second unified data model, wherein if the attributes accessible from the original information correspond to the attributes to be unified in the unified information unit, the unified information unit is directly produced, and wherein if the attributes accessible from the original information do not correspond to the attributes to be unified in the unified information unit, before the step (ii), the program code further performs a step (i') of firstly re-defining, by the matterizer, the original information by logically re-organizing the attributes and the associated link of the original information and then converting the original information into a new original information with attributes corresponding to the attributes to be unified in the unified information unit, so that the unified information unit is indirectly produced in the step (ii).

17. The computer program product according to claim 16, wherein if the original tool from the plurality of information sources is compatible with a working environment of a workspace, the unified tool is directly produced according to the attributes and the associated link of the original tool, wherein if the original tool from the plurality of information sources is incompatible with the working environment of the workspace, the unified tool is indirectly produced via an adapter and/or a software development kit (SDK) of the original tool to drive the original tool, and wherein the adapter provides an interface implementation compatible with the workspace.

* * * * *